May 8, 1928. 1,669,305
J. PATIERNO
SAFETY COCK
Filed Nov. 21, 1927
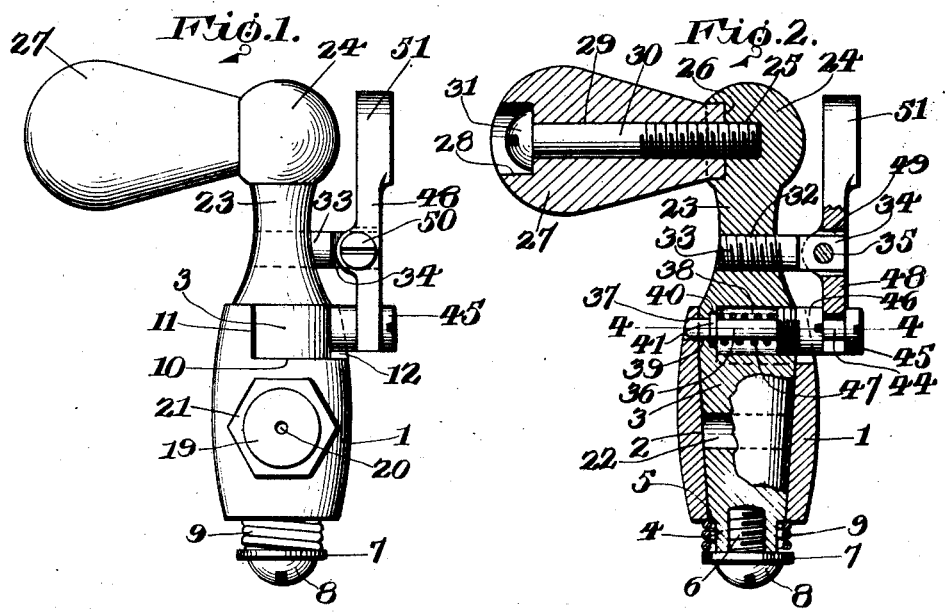
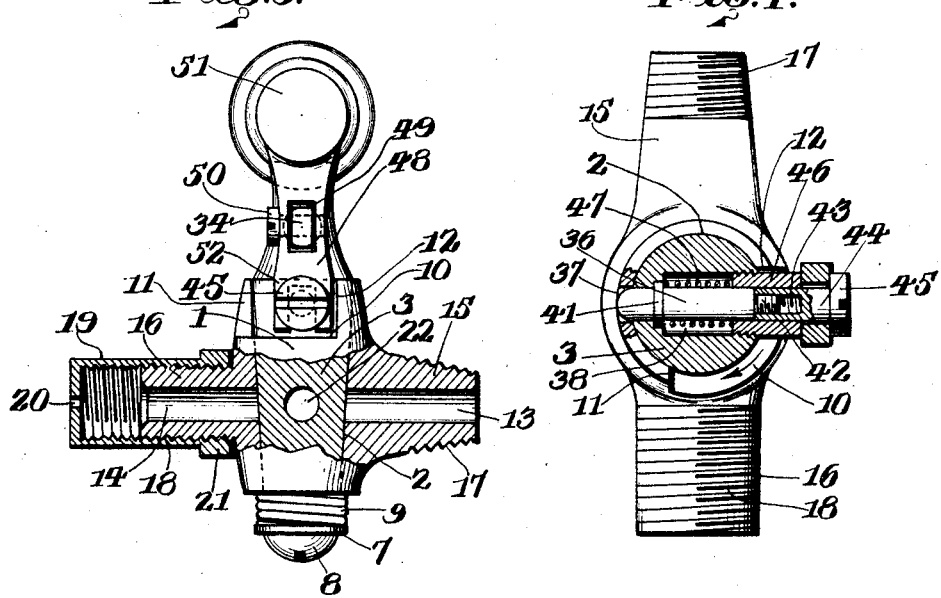
INVENTOR.
John Patierno,
BY
Geo. P. Kimmel
ATTORNEY.

Patented May 8, 1928.

1,669,305

UNITED STATES PATENT OFFICE.

JOHN PATIERNO, OF SCHENECTADY, NEW YORK.

SAFETY COCK.

Application filed November 21, 1927. Serial No. 234,748.

This invention relates to a safety cock and has for its object to provide, in a manner as hereinafter set forth, a device of such class provided with new, original, durable, spring controlled, compact, conveniently releasable and thoroughly efficient means for latching the valve plug of the cock when shifted to closed position to prevent the accidental opening of the latter.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation of a safety cock in acccordance with this elevation and in closed position.

Figure 2 is a vertical sectional view of a safety cock in accordance with this invention and in closed position.

Figure 3 is a sectional elevation of the safety cock and illustrating the same in closed position.

Figure 4 is a section on line 4—4 Figure 2.

Referring to the drawings in detail 1 denotes a housing of tubular form having its inner diameter gradually increasing from its lower to its inner end and which provides a chamber 2 for a plug valve 3 which corresponds in contour to the shape of the chamber 2 and snugly fits the wall of the latter. The valve 3 has a reduced extension 4 at its lower end which provides a shoulder 5 flush with the bottom edge of the housing 1. The extension 4 is provided with a socket 6 opening at the bottom of said extension and having its wall threaded. Positioned against the extension 4 is a washer 7 and bearing against the latter and threadedly engaging with the wall of the socket 6 is a threaded screw 8 providing means for retaining the washer 7 in abutting engagement with respect to the extension 4. The washer 7 is of greater diameter than the extension 4 and surrounding the latter and interposed between the shoulder 5 and the washer 7 is a coiled controlling spring 9. The spring 9 tends to maintain the valve 3 in snug fitting engagement with the wall of the chamber 2. The housing 1, at its top, is cut away to the extent of one-fourth of its circumference to provide a ledge 10 and a pair of vertically disposed spaced shoulders 11, 12. The shoulders limit the turning action of the valve 3 in either direction for a quarter turn thereof. The housing 1 is formed with an intake port 13 which opens into the chamber 2 and an outlet port 14 which communicates with and extends from the chamer 2. The housing 1 is furthermore provided with a pair of oppositely disposed lateral extensions 15, 16, the former having a tapered periphery and peripherally threaded as at 17 for connection to a gas supply line. The extension 16 is of uniform outer diameter and peripherally threaded as at 17 and engaging therewith is an interiorly threaded, flanged cap 19 which projects a substantial distance from the extension 16 and is formed with a jet or discharge opening 20. The extensions 15 and 16 are tubular and the inner diameter thereof corresponds to the inner diameter of the intake opening 13 and outlet opening 14 respectively. The outer diameter of the extension 16, at its inner end, is less than the outer diameter of the extension 15 whereby the flange 21 of the cap 19 can abut against the periphery of the housing 1. The flange 21 of the cap 19 is of polygonal contour. See Figure 1. The valve 3 is formed with a diametrically disposed opening 22, which is adapted to register with the intake 13 and outlet 14 when the cock is in open position. The opening, port or passage 22 will register with the intake 13 and outlet 14 when the valve 3 is given a quarter turn in a clock-wise direction, as indicated by the arrow in Figure 4. The shoulder 11 arrests the shifting movement of the valve 3 when moving in a clock-wise direction and the shoulder 12 arrests the shifting movement of the valve 3 when it is moving in an anti-clock-wise direction.

Formed integral with the valve 3 is a stem 23 having a head 24, provided with a counter-sunk socket 25 whereby the wall thereof will form a seat 26. The wall of that part of the socket of smallest diameter is threaded. Extended into the head 24 and bearing against the seat 26 is a handle member 27 formed at its outer end with a socket 28 and further provided with an axially arranged bore 29 which opens at its outer end into the socket 28. Extending through the bore 29 and threadedly engaging with the threaded wall of the socket 25 is a headed securing device 30 for the handle member 37. The head of said device is indicated at 31 and is seated in the socket 28. The bore 29 is of materially less diameter than the diameter of the socket 28 and the head 31 of the device 30 is of greater diameter than the bore 29. The device 30 detachably secures the handle member 27 to the head 24 and said member 27 is disposed at right angles with respect to the stem 23.

The stem 23 intermediate its ends is provided with a diametrically disposed opening 32, having the wall thereof threaded and engaging with the threads of the wall of the opening 32, and extending at right angles with respect to the shank 23, is a peripherally threaded arm 33 having a reduced outer end 34, provided with an opening 35. The arm 32 forms an element of the latching means for securing the valve 3 in closed position, and said means includes a spring controlled latching member 36, having one end thereof capable of engaging in an opening 37, formed in the housing 1, near the top thereof, and when so engaged the valve 3 will be secured in closed position. The valve 3 at its top is formed with a diametrically disposed socket 38 opening above the ledge 10, and the valve 3 is furthermore provided with a diametrically extending opening 39 which communicates with the socket 38. The opening 39 is countersunk as at 40. The latching member 36 is provided with a peripheral, annular shoulder 41 which seats in the countersink 40 when the member is engaged in the opening 37. The locking member 36 is formed at its outer end with a reduced peripherally threaded extension 42, which threadedly engages in a socket 43 formed in a cylindrical member 44, provided with a head 45. Threadedly engaging with the wall of the socket 38 at the outer end thereof is a sleeve 46 having its outer end opposing the head 45 of the member 44, as well as being spaced therefrom. Mounted on the latching member 36 and interposed between the inner end of the sleeve 46 and the base of the socket 38 is a coiled controlling spring 47. The latching member 36 and cylindrical member 44 bodily move together and shift through the sleeve 46. The spring 47 normally tends to maintain the latching member 36 in the opening 37 to latch the valve 3. The shoulder 41 acts to compress the spring 47 when the latching member 36 is shifted to release position, and the shifting of said member is had through the medium of a shifting lever 48, provided intermediate its ends with a slot 49, through which extends the reduced end 34 of the arm 33. The lever 48 is pivotally connected to the reduced end 34 of the arm 33, by the pivot 50. The upper end of the lever 48 is provided with a finger piece 51. The lower end of the lever 48 is bifurcated as at 52 for the purpose of straddling the cylindrical member 44 and is interposed between the outer end of the sleeve 46 and the head 45. The spring 47 normally tends to maintain the lever 48 in the position shown in Figures 1 and 2. By pressing the upper end of the lever 48 towards the head 24, the latching member 36 is shifted clear of the opening 37 whereby the valve 3 can be shifted from closed to open position. It is not necessary to retain pressure on the upper end of the lever 48 after the member 36 has been moved clear of the opening 37. When the valve 33 is moved in an anti-clock-wise direction the member 36 snaps into the opening 37 and latches the valve.

The construction and arrangement of parts prevent the accidental shifting of the valve 3 from closed to open position and further act to maintain the valve 3 in closed position, and therefore it is thought the many advantages of a safety cock, in accordance with this invention, can be readily understood, and although the preferred embodiment of the invention is as illustrated and described, yet it is to be understood that changes in the details of construction can be had which fall within the scope of the invention as claimed.

What I claim is:

1. In a cock of that type including a valve plug, a housing therefor and a stem extended from the plug, the combination of a spring controlled latching means carried by the plug for normal engagement in the housing to latch the plug, an arm anchored to the stem, and a latching means releasing lever pivoted intermediate its ends and having one end straddling said means in proximity to the outer end thereof.

2. In a cock of that type including a valve plug, a housing therefor and a stem extended from the plug, the combination of a spring controlled latching means carried by the plug for normal engagement in the housing to latch the plug, an arm anchored to the stem, and a latching means releasing lever pivoted intermediate its ends and having one end straddling said means in proximity to the outer end thereof, said means projecting at right angles from the housing, and said arm projecting at right angles to the stem and having its outer end reduced for extension into the lever and carrying the pivot for the latter.

3. In a cock of that type including a valve plug, a housing therefor, and a stem extended from the plug, the combination of a releasable spring controlled latching means disposed diametrically with respect to the plug and housing and normally engaging in one side of the housing for latching the plug, said means projecting from the housing at that side opposite the side with which said means engages, and a latching means releasing lever pivotally supported from the stem and permanently engaging with said latching means in proximity to the outer end thereof.

4. In a cock of that type including a valve plug, a housing therefor, and a stem extended from the plug, the combination of a spring controlled latching means extending transversely of the plug and housing and normally engaging one side of the housing to latch the plug and projecting from the housing at that side opposite the side with which said means normally engages, an arm for anchoring to the stem, and a latching means releasing lever pivoted intermediate its ends to said arm and having a bifurcated lower end straddling said means in proximity to the outer end thereof.

In testimony whereof, I affix my signature hereto.

JOHN PATIERNO.